United States Patent Office

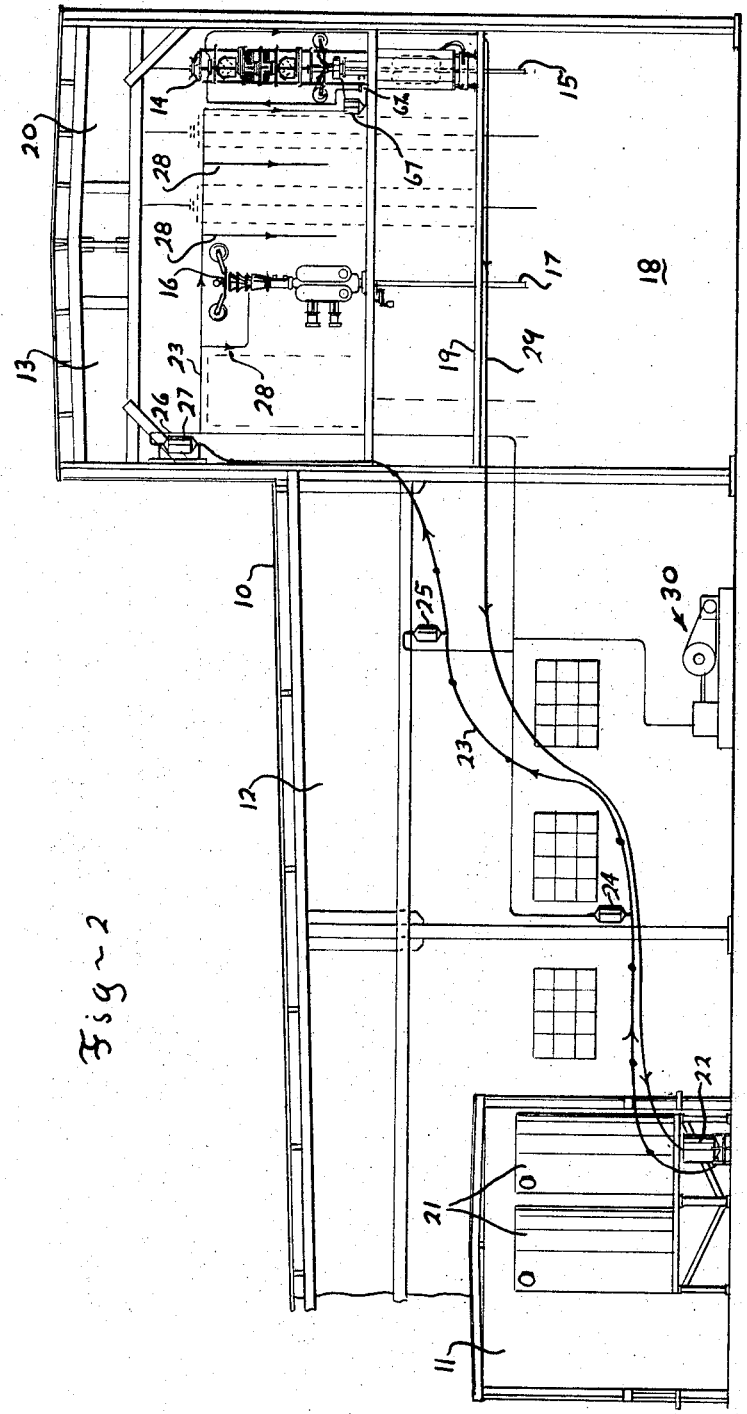

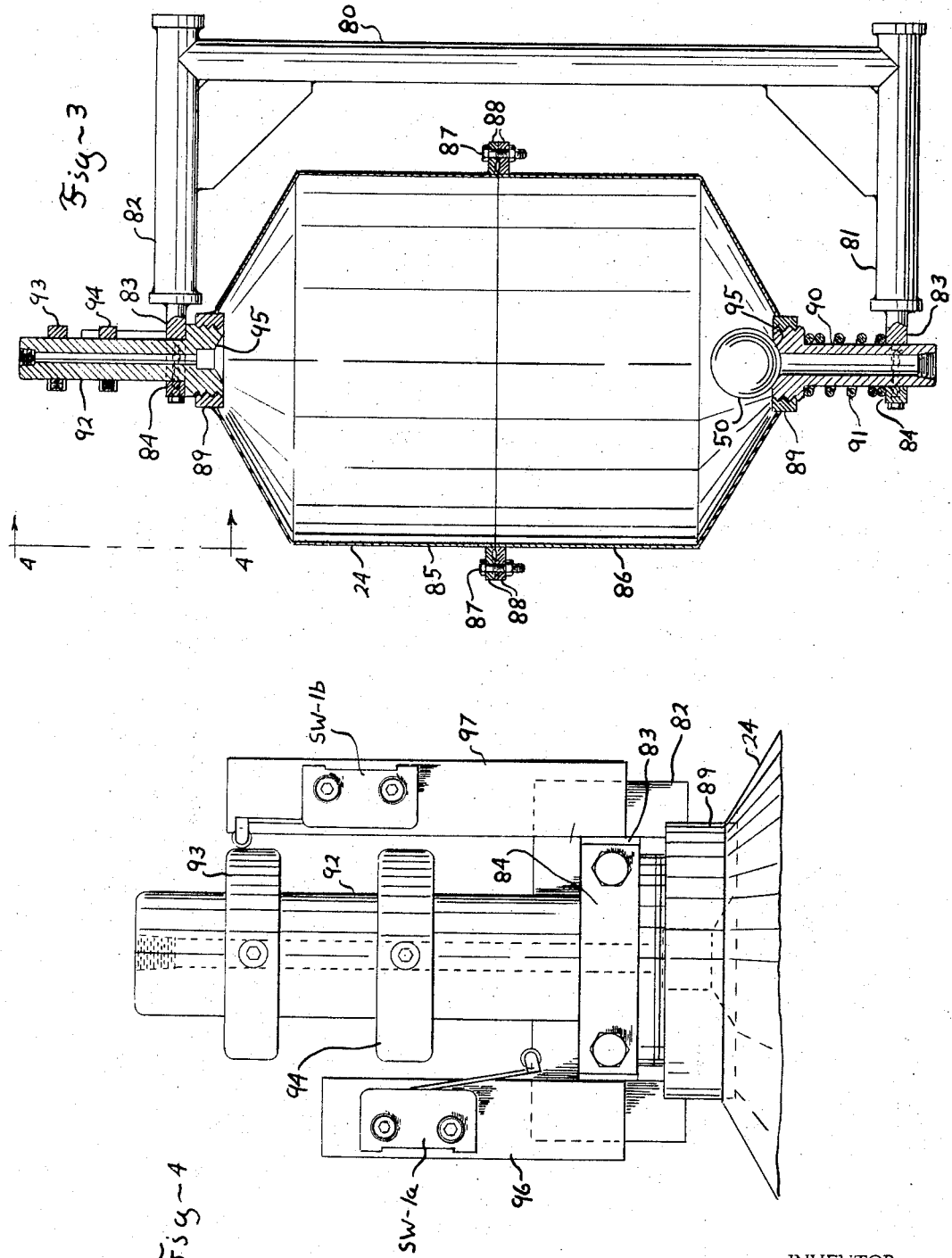

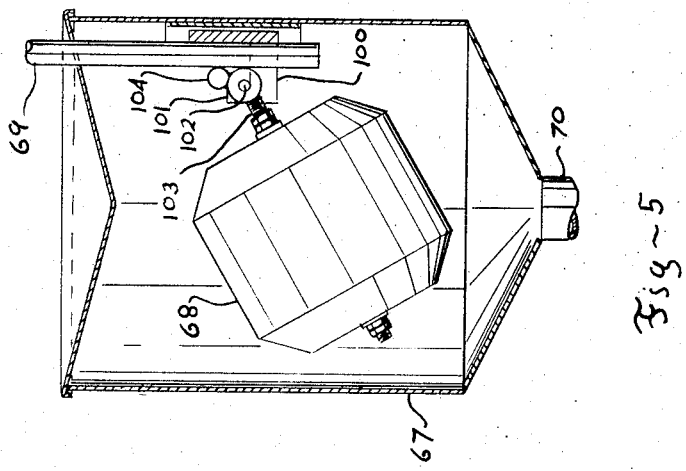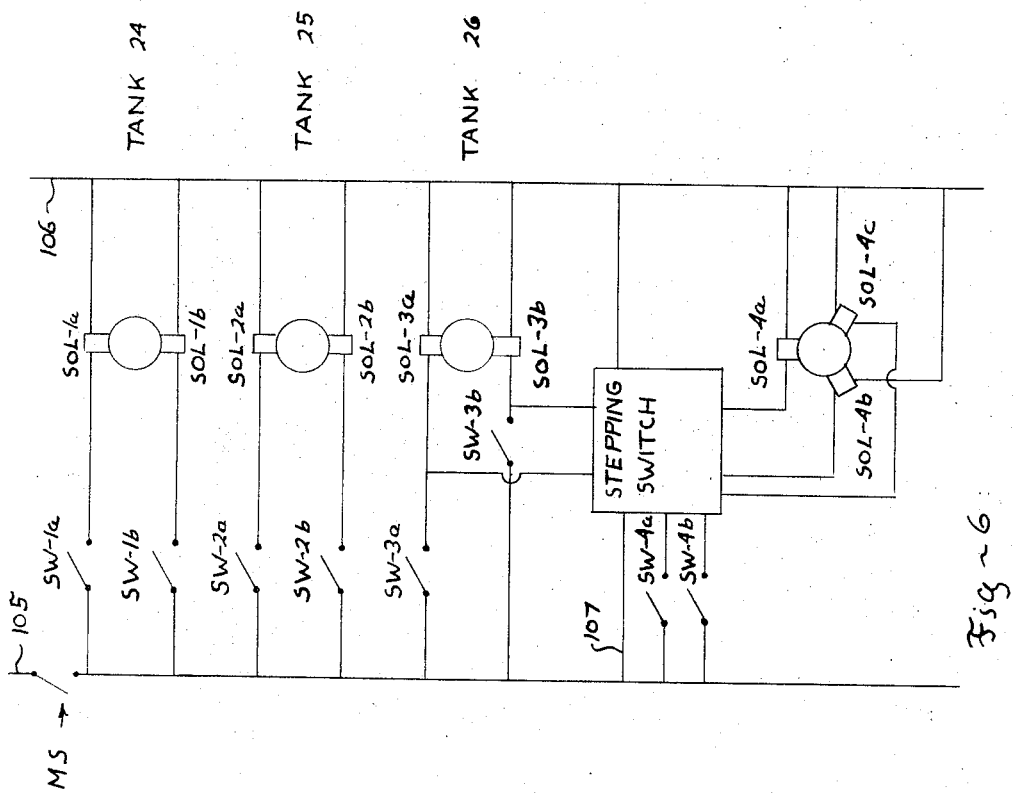

3,345,999
SYSTEM FOR PREPARING AND DELIVERING LIQUID RESIN
LeRoy R. Boggs, Bristol, Tenn., assignor to Universal Moulded Fiber Glass Corp., Bristol, Va., a corporation of Delaware
Filed Aug. 4, 1964, Ser. No. 387,357
4 Claims. (Cl. 137—205)

This invention relates to a method and a system for handling liquid resins of the heat sensitive type. It is particularly concerned with such methods and systems which are adapted to deliver the resin from the place where it is finally blended into the formulation in which it is to be used, to the point of use of the resin.

The problems which are overcome by the present invention are well illustrated by considering a facility in which polyester resins are used. These resins are thermosetting resins. That is to say, they change irreversibly from a liquid to a solid by means of cross linking reactions which are usually carried out in the presence of heat. The hardened product is a plastic having a wide variety of uses, especially when it is reinforced with various materials such as glass fibers.

A number of processes have been developed for making articles of polyester resins and reinforcing fibers. In the broadest terms, these processes include the steps of arranging the reinforcing materials such as glass fibers into the desired locations, applying resin in liquid uncured form to the reinforcing material to form, in a manner of speaking, a matrix of resin in which the reinforcement is located, and causing the setting of the resin by the application of heat to form a unitary article consisting of hardened resin surrounding and reinforced by the fiber material.

Polyester resins are complex polymeric compounds with unsaturation in the molecule at various points along the length thereof. The presence of the unsaturation makes it possible to cross-link adjacent molecules of polyester with cross-linking agents such as vinyl monomers, and this is, in fact, the reaction which takes place upon heat hardening of the resin.

From the foregoing it can be appreciated that a polyester resin formulation which is ready for use contains two principal components, the polyester and a cross-linking agent. For stability in storage and transportation, the formulation also generally contains an inhibitor such as, for example, hydroquinone. At about the time the resin formulation is to be used, a catalyst is added which overcomes the action of the inhibitor and provides a supply of free radicals. The free radicals attack the double bonds in the polyester molecules, thus initiating the cross-linking reaction. The reaction is accelerated when heat is applied. Various kinds of catalysts are used, including benzoyl peroxide and methyl ethyl ketone peroxide.

Great variation in the properties of the hardened product, and great variation in the curing properties of the resin, can be obtained by altering the specific compounds and the proportions thereof used in the formulation. Some of the adjusting of the formulation is most desirably performed as a part of the operation of manufacturing the resin. However, other adjustment steps are most desirably performed as part of the operation of manufacturing finished articles from the resin. For example, it is not practical to add the catalyst to the resin formulation more than a relatively short time before curing. Resin to which the catalyst has been added is not very stable, even in the absence of temperatures which are high enough to be ordinarily considered curing temperatures. Because of the nature of the cross-linking reaction, the presence of a small amount of cured resin in a batch of catalyzed resin will tend to seed the partial curing, at least, of the remaining resin. In addition, certain fillers and pigments are best added immediately prior to use, because they show a tendency to settle out of the resin upon long standing.

Some of the physical properties of polyester resin formulations present additional problems, and make it difficult to cope adequately with the problems arising from the chemical properties. In particular, the resin formulations which are most useful are relatively high in viscosity. The general range of viscosity for this type of material is from about 150 to about 4,000 c.p.s. but some specially formulated resins have viscosities as high as 200,000 c.p.s. One consequence of the relatively high viscosity of the resin formulation is that thorough mixing is necessary in order to disperse additives such as the catalyst and the fillers. This mixing can be accomplished by various types of agitators, but substantially all of them also beat considerable quantities of air into the resin formulation. In fact, some resin formulations tend to form stable foams upon being agitated. The entrained air or other gas is an undesirable factor in the production of some products, because, if the resin is not degassed, at least in part, the entrained air may appear in the final product as voids or pores and may tend to make the product porous.

The high viscosity of the resin formulations also means that the pressure drop in lines through which the resin passes is high, or, stated differently, that relatively high pumping pressures are needed to pump quantities of resin for an appreciable distance. As is known, most pumps operate in such a way that friction is developed between the various parts which are moving with respect to each other, and the presence of friction means the presence of heat. Furthermore, the action of the pump parts on the liquid itself creates friction and tends to raise the temperature of the resin. Thus, in a great many pumps which are satisfactory for other purposes, enough heat is generated at various locations in the pump to start the curing reaction in a catalyzed resin formulation which is being pumped. The resin tends to set up or cure right in the pump, and in doing so will tend to jam the pump or at least radically alter its mode and efficiency of operation. Furthermore, the curing reaction which is seeded in the pump will tend to continue as the resin formulation flows out of the pump and into the lines down stream. Thus the resin will tend to set up or cure in these lines and clog them.

From the foregoing it can be seen that the peculiar set of properties of heat hardenable polyester resin formulations, particularly those which are catalyzed, creates an extraordinary set of materials handling problems in successfully performing the final blending of the resin and in transporting it from the point of final blending to the point of use.

In the discussion thus far a distinction has been drawn between "resin" and "polyester resin" on the one hand, and "resin formulation" and "polyester resin formulation" on the other hand. The former terms have been used to refer to the polyester itself, while the latter terms have been used to refer to the blends of materials which are heat hardenable. This distinction will not be rigorously maintained in the discussion which follows, and the term "resin" when used hereafter should be understood to include the blended material which is heat hardenable.

The foregoing comments have involved the problems inherent in the blending and handling of polyester resins. However, those skilled in the art will appreciate that other kinds of heat hardenable resins present problems of the same general type although they vary in degree from one kind of resin to another. For example, epoxy resins present many of the same problems as polyester resins. The method and system of the present invention is especially useful for handling polyester resin but is also useful with other heat hardenable resins and other heat sensitive materials.

The foregoing difficulties are in large measure overcome according to the present invention by moving the freshly blended resin from the point of mixing to the point of use through a series of vacuum vessels arranged along the flow line between the two points. By utilizing a vacuum system to transport the resin, the undesirable local heating in the pumps which leads to curing of the resin and destructive jamming of the pumps and lines is eliminated. Furthermore, the employment of a vacuum transportation system, especially with the use of vacuum staging tanks, tends to contribute to the degassing of the freshly mixed resin, during the transportation thereof to the point of use.

It is an object of this invention to provide a method and a system for delivering heat hardenable resin from a point of final blending or preparation to the point of use of the resin.

Another object of the present invention is to provide a method and system for lifting resin to a point of use at a greater elevation than the point where the resin is stored and mixed.

Still another object of the present invention is the provision of a resin pumping system for lifting resin through a distance greater than the tallest column of resin which can be supported by the atmosphere.

It is an object of the present invention to provide a method and system for concurrently transporting and degassing liquid heat hardenable resin.

The above objects and purposes together with other objects and purposes can best be understood by considering the detail description which follows, together with the accompanying drawings in which:

FIGURE 2 is a somewhat diagrammatic sectional elevational view of a factory building having a resin handling system according to the invention installed therein;

FIGURE 3 is a sectional elevational view of a vacuum tank employed in the present invention;

FIGURE 4 is a fragmentary elevational view of a control mechanism located at the top of the vacuum tank of FIGURE 3, the view being taken looking in the direction of the arrows 4, 4 on FIGURE 3;

FIGURE 5 is a sectional elevational view of a feed tank for use in the resin system of the present invention; and FIGURE 6 is a simplified diagram of a control system for use with the present invention.

Figure 1:
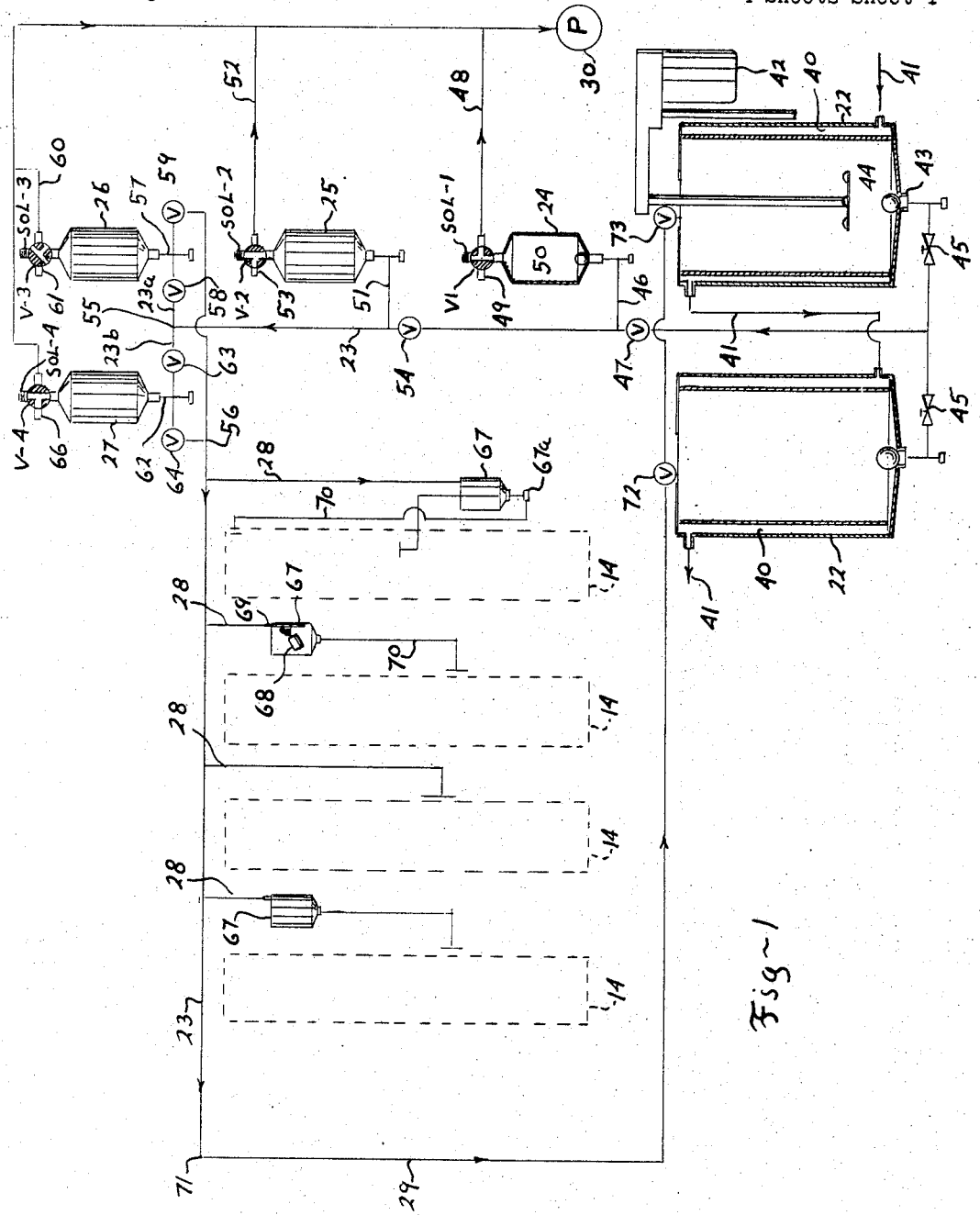
FIGURE 1 is a flow diagram illustrating a resin handling system arranged according to the invention.

Attention is first directed to FIGURE 2 which illustrates the kind of problems which commonly occur in laying out equipment for use in a factory, and at the same time illustrates how the solution of these problems is facilitated by the resin delivery system of the present invention. A factory building 10 of conventional construction includes a resin storage and mixing room or wing 11, a work room 12, an a loft room 13. It is in the loft room 13 that machines for making continuous lengths of glass fiber reinforced resin articles are located.

Machines of this kind will not be described in detail herein, since they do not per se form part of the present invention. However, the apparatus 14 is a continuous filament winding machine of the kind shown and described in my copending U.S. patent application Ser. No. 299,636, filed August 2, 1963, now Patent 3,306,797. This type of machine is designed to produce continuous lengths of articles such as pipe having, inter alia, helically wound glass fiber reinforcing. A finished pipe issues from the bottom of the machine as at 15. Two other continuous filament winding machines are shown in phantom outline beside the one appearing in full lines. A continuous extraction machine 16 is also shown in the loft room 13. This type of machine is shown and described in detail in my copending U.S. patent application Ser. No. 169,908, filed Jan. 30, 1962, now Patent 3,235,429. The machine 16 is designed to produce a variety of glass fiber reinforced fiber glass shapes, including pipe, and the product issues downwardly from the machine as at 17. Another continuous extraction machine is shown in phantom outline beside the one appearing in full lines.

From FIGURE 2 it can be seen that both the continuous filament winder 15 and the continuous extraction machine 16 are tall pieces of equipment. They are mounted on decks within the loft room 13. Beneath the machinery decks is a run-out room 18 forming the lower part of the loft room. It is preferred that the distance between the floor of this room and the first machinery deck 19 be fairly great, in order to gain full advantage of the fact that the machines 14 and 16 can produce long lengths of material such as pipe. Above the machinery decks in the loft room is a materials deck 20 where the reinforcing material, which is usually glass fiber, is stored and, if desired, fed downwardly to the machines below.

From this discussion it can be appreciated that the resin must be delivered to machines demanding it more or less continuously, which machines are located at a considerable elevation, frequently extending up to 40 feet or more, above the floor of the factory. The purchased resin is stored in tanks 21 at ground level in the factory. The details of the resin handling system will be discussed more fully in connection with FIGURE 1, but here it can be pointed out that mixing tanks or vessels 22 are located in the mixing room 11 near the storage tanks 21. A resin feed line 23 extends from the mixing tanks 22 to the upper region of the loft room 13. Spaced along it are resin vacuum tanks 24, 25, 26 and 27. The latter two tanks are located at the highest point in the resin feed system. From these tanks the feed line 23 runs across the loft room 13 and branch lines 28 diverge from the feed line to deliver resin to the individual machines in the battery. A return line 29 extends from the end of feed line 23 back across the loft room and downwardly to the mixing vessel 22.

Vacuum lines are connected to the top of each of the resin tanks 24, 25, 26 and 27, and these lines are connected to a vacuum pump 30 in the work room 12 of the factory.

While FIGURE 2 shows a particular factory layout, it does provide an illustration of the problems which will occur generally, regardless of differences in details which may vary from factory to factory. The resin is stored at a place which is spaced from the point of use both horizontally and vertically. The resin delivery system must have a capacity and a flexibility adequate to meet the demands of a battery of machines of varying types and speeds of operation. Thus the system must be able to serve a set of machines which demand resin at varying rates over the course of time. All of these requirements are effectively met by the system of the present invention.

Attention is now directed to FIGURE 1 which presents diagrammatically a resin handling system constructed according to the invention. The mixing vessels 22 are generally cylindrical in shape and are preferably provided with cooling jackets 40. Cooling water can be flowed through the jackets by means of water lines 41. In this way resin being mixed in the vessels is kept well below the hardening temperature. A mixer is shown diagrammatically at 42. It is preferably mounted so that it can be readily moved from one of the mixing vessels to the other, thus making it unnecessary to have a separate mixer for each vessel. The floor of each mixing vessel is conical in shape and has an outlet 43 in the center. A buoyant ball 44 is located in the tank, and as the tank empties, it will seat itself over the opening 43. In this way the admission of large quantities of air into the vacuum system will be eliminated. The two mixing vessels 22 are connected to resin feed line 23 through valves 45 which may be manually or remotely controlled. The mixing tanks 22 are also connected to the storage tanks 21 by suitable piping and valving so that the operator may draw resin from either of the storage tanks 21 into either of the mixing tanks 22 as he desires.

It is preferred that two mixing tanks be provided so that a batch of resin can be blended in one tank while the other tank is being emptied and the resin in it is being drawn through the system. In this way a continuous supply of resin to the machines is provided for, even though the adding of catalyst, etc., and blending is performed in batches.

In FIGURE 1, the resin feed line 23 is shown as a vertical line, but it will be recalled from the discussion in FIGURE 2 that feed line 23 may extend horizontally as well as vertically from the mixing vessels. Resin vacuum tank 24 is connected to the feed line 23 by means of resin vacuum tank line 46 which extends between the bottom of the tank and the feed line 23. It thus establishes a resin flow path so that resin can flow between the tank 24 and feed line 23 in either direction. A check valve 47 is positioned just below the point of connection of line 46 to line 23. The valve is oriented so that liquid can pass freely upwardly through it, but cannot pass downwardly. Valve V-1 is mounted on top of resin vacuum tank 24 and is operated by solenoid SOL-1. The valve is constructed to alternately connect the interior of the tank 24 to vacuum line 48 or to vent 49. The vacuum line 48 is connected to vacuum pump 30. A buoyant ball 50 is positioned inside vacuum tank 24 and as the tank empties it seats at the lower outlet of the tank. Similarly, as the tank fills, the ball seats at the upper outlet of the tank.

Resin vacuum tank 25 is in all respects similar to tank 24, but it is connected to line 23 by means of vacuum tank line 51 at a point higher on line 23 than corresponding line 46 associated with tank 24. The valve at the top of tank 25 is designated V-2, and the solenoid controlling it SOL-2. The vacuum line for tank 25 is designated 52 and the vent 53. A check valve 54 is positioned in line 23 below the junction of that line and resin tank line 51. This check valve, like check valve 47, permits flow of liquid upwardly but not downwardly.

Two vacuum tanks 26 and 27 are provided at the top of the resin feeding system, and since they differ somewhat in operation from the intermediate tanks 24 and 25, they are here called resin storage tanks. As will be explained in fuller detail hereinafter, the operation of tanks 26 and 27 is coordinated so that one of them is always available to deliver resin to the machines, while the other is being filled. Resin feed line 23 divides into two branches 23a and 23b at point 55; the two branches converge again at point 56. Resin storage tank 26 is connected to line 23a through storage tank line 57. Check valve 58 is mounted in line 23a to permit flow through that line toward tank 26, but to prevent back flow toward point 55. Line 23a also contains a selectively operable valve 59, which may be manually operated, or, if desired, automatically controlled. Like tanks 25 and 24, tank 26 has a valve V-3 mounted at the top thereof. The valve is controlled by solenoid SOL-3 and is constructed to alternatively connect the interior of the tank to vacuum line 60 or vent 61.

Tank 27 is connected to line 23b through storage tank line 62. Line 23b also contains a check valve 63 and a selectively operable valve 64. Valve V-4 at the top of the tank is similar to the earlier mentioned valves except that it has three positions. It is constructed to connect the interior of the tank to vacuum line 65 or to vent 66 or to close off the top of the tank completely. This valve is controlled by solenoid SOL-4.

From the point of convergence of lines 23a and 23b, line 23 runs past the battery of machines. The machines may be of the type indicated at 14 in both FIGURES 1 and 2, or some or all of the machines may be of other types such as the one shown at 16 in FIGURE 2. A branch line 28 leads to the resin utilizing portion of each of the machines.

In some cases, it is desirable to use a feed tank 67 to assist in maintaining a uniform pressure head on the resin being fed to a particular machine. The tank 67 is equipped with a float 68 which pinches the input hose 69 to close it when the desired level of resin is reached in the tank. As resin is withdrawn through line 70 from the bottom of the tank, the float 68 drops and allows hose 69 to open somewhat thus demanding fresh resin from tank 26 or 27.

As shown on FIGURE 1, the local resin supply tank or feed tank 67 can be mounted for cooperation with the resin consuming machines and for cooperation with the other parts of the resin supply system in several different ways. For example, the local feed tank 67 shown adjacent the machine which is third from the left in FIGURE 1 is positioned somewhat above the point of input or use of the resin in the machine. Thus the resin flows downwardly from the tank 67 to the place where it is introduced into the machine.

On the other hand, the local feed tank 67 which is mounted adjacent the right-hand most machine in FIGURE 1 is mounted relatively low on the machine. When the machine is one of the kind shown at 14 in FIGURE 2, its general mode of operation is such that an excess quantity of resin is fed into the machine near the top thereof at the point of use or input, and the excess flows downwardly through the machine together with reinforcing material. At a point on the machine somewhat before the heat hardening operation, the excess fraction is removed from the machine. In the arrangement shown for the right-hand most machines in both FIGURES 1 and 2, the local feed tank 67 is positioned at an elevation below the point of removal of the excess resin so that the excess is flowed into the feed tank. A small pump 67a is connected to the line running from the bottom of the local supply tank. The pump pumps resin from the tank through line 70a to the point of introduction of resin into the machine near the top thereof. Fresh make-up resin is supplied from the resin supply system through line 28. As in the arrangement discussed earlier, it is preferred that the flow through line 28 be controlled by means of a float valve in the local feed tank 67.

It should also be noted that no local supply tank 67 is utilized for the machine which is second from the left in FIGURE 1.

Resin feed line 23 ends at point 71. From this point a return or recycle line 29 leads back to the mixing vessel 22. Valves 72 and 73 are provided so that the operator may select the mixing vessel to which the returned material is to be delivered.

The structure of a vacuum tank conforming with the invention is shown in FIGURE 3. The tank is mounted on the wall or other convenient structural member of the factory building by means of mounting frame 80 which has a cantilevered bottom supporting member 81 and a similar cantilevered top supporting member 82. Both of the supporting members 81 and 82 terminate in yokes 83. The outer ends of the yokes are closed by bars 84 which are attached to the yokes by means of machine screws. The tank 24 is formed of two substantially identical sections, the upper half being designated 85 and the lower half 86. Each section is substantially cylindrical with a conical end. The upper and lower halves are attached to each other by means of bolts 87 passing through the flanges 88.

At the apex of the cone of each section of the tank there is mounted a collar 89. A hollow shaft 90 is threaded into the bottom collar 89. This shaft passes through the bottom yoke 83. A supporting spring 91 surrounds shaft 90 and bears against lower yoke 83 at one end and the enlarged part of shaft 90 at the upper end. In this way the tank 24 is spring mounted on the lower support arm 81. As a consequence, when the gross weight of the tank is greater by reason of the presence of resin in the tank, the tank will compress spring 91 and sit at lower elevation than it will when the tank is empty.

A hollow shaft 92 is threaded into the upper collar 89. This shaft passes through upper yoke 83. The dimensions of shaft 92 and yoke 83 are so selected that the shaft can slide freely through the yoke as the changing weight of the tank causes it to rise or fall. Two control collars 93 and 94 are attached to the upper shaft 92 by means of set screws. The exact position of each control collar on the shaft can readily be adjusted by loosening the set screw and moving the collar.

In FIGURE 3 it can be seen that both the lower shaft 90 and the upper shaft 92 are provided with conical seats 95. A buoyant ball 50 is located in the tank. As the tank fills with resin, the ball 50, by reason of the conical shape of the upper end of the tank and the conical seat in shaft 92 will position itself in the seat 95 of the upper shaft and in this way block the hollow passage through that shaft. When the tank is nearly empty, the ball 50 will settle onto the seat 95 of lower shaft 90 and block the hollow passage through that shaft.

A valve such as V-1 is attached to the top of upper shaft 92. As mentioned before, the valve is connected on one side to a vacuum line and on the other side to a vent to the atmosphere. A resin vacuum tank line such as 46 is connected to the bottom shaft 90. Both the connection to the vacuum line and the connection to the resin tank line are made in such a manner that these lines will cause no interference with the vertical movement of the tank on its spring mounting.

Attention is now directed to FIGURE 4. Two switch mounting posts 96 and 97 are mounted on the upper yoke 83. The post 96 carries switch SW–1a and post 97 carries switch SW–1b. Switch SW–1 and control collar 94 on shaft 92 are so positioned with respect to each other that control collar 94 will actuate switch SW–1 when the tank 24 is substantially full and has compressed spring 91. Switch SW–1b and control collar 93 are so positioned with respect to each other that the collar 93 will actuate switch SW–1b when tank 24 is substantially empty and when it is compressing spring 91 only a small amount. The manner in which the signals generate by actuation of these switches are utilized for control purposes will be discussed in greater detail below.

FIGURE 5 illustrates the feed tank 67 which was mentioned earlier in connection with FIGURE 1. The tank 67 is generally cylindrical and has a conical bottom. Line 70, which leads to the resin utilizing machines either directly, or through an auxiliary pump, is fitted to the bottom of tank 67. A generally U-shaped clamp 100 is mounted on the inside wall of tank 67. It serves to hold hose 69 in position against the wall of the tank. It will be remembered from FIGURE 1 that resin from the tanks 26 and 27 flows through lines 23 and branch line 28 to hose 69. In effect, hose 69 is an extension of branch line 28. Clamp 100 carries at its outer end a cylinder 101 mounted on the clamp by means of shaft 102. Attached to the cylinder is float arm 103 which is connected to the float 68. Also attached to cylinder 101 is a pinch bar 104.

As the level of resin in tank 67 rises, it will tend to rotate the float 68 about the shaft 102 in a clockwise direction. Since both the float and pinch bar 104 are attached to cylinder 101, such rotation of the float will cause clockwise rotation of the pinch bar. Thus the pinch bar 104 will move against the flexible hose 69 and pinch it. The passage through the hose will be substantially completely pinched off when the level of resin in the tank is at a maximum. As the level of resin in tank 67 falls, the float 68 tends to rotate in a counterclockwise direction and pinch bar 104 moves away from hose 69, thus opening the passage through the hose. The construction just outlined thus tends to establish and maintain a constant level of resin in tank 67 by increasing the flow through line 69 when the level tends to fall and by decreasing the flow when the level tends to rise.

A simplified control system is shown in FIGURE 6. It should be understood that the system and method of the invention can be practiced manually without the use of an automatic control system and that automatic control systems other than the one illustrated herein can be used with the system of the invention. Furthermore, control systems can be used which are partly automatic and partly manual in direction.

By comparing FIGURES 1 and 6, one can see that the solenoid designated SOL–1, which is associated with valve V–1, is shown in FIGURE 1 as a single unit, but has been split into two parts, namely SOL–1a and SOL–1b in FIGURE 6, for clarity of illustration. The other solenoids, namely SOL–2, SOL–3 and SOL–4 have been broken up in a similar manner for the same purpose. Lines 105 and 106 are connected to a source of alternating current, and a main switch MS is provided in line 105 for energizing and deenergizing the control equipment as a whole.

Attention is first directed to valve V–1 on FIGURE 6 and the solenoid and switches associated therewith. The valve is so constructed that it will remain in a given position until it is thrown to another position by the energization of one of the solenoids SOL–1a or SOL–1b. It will remain in the new position despite the deenergization of that solenoid until the other solenoid is energized to throw the valve to its other position. A study of FIGURE 4 will show that when vacuum tank 24 is substantially full, normally open switch SW–1a will be closed by collar 94. When vacuum tank 24 is substantially empty, switch SW–1b will be closed by collar 93. When tank 24 is filling and when it is draining, both switch SW–1a and switch SW–1b will be in their normally open positions.

Solenoid SOL–1a is attached to valve V–1 so that it will throw the valve to a position such that the vent 49 (see FIGURE 1) communicates with the interior of tank 24. As can be seen on FIGURE 6, closure of switch SW–1a energizes SOL–1a thus throwing valve V–1 to the vent position. SOL–1b is so fitted to V–1 that it will throw the valve to a position connecting the vacuum line 48 with the interior of tank 24. Closure of SW–1b energizes the solenoid to throw valve V–1 to the vacuum position.

With the foregoing description in hand, the preferred mode of operation of tank 24 can be outlined. When the tank is empty, switch SW–1b is closed thus causing SOL–1b to throw valve V–1 to the vacuum position. As a consequence of the lowered pressure within tank 24, resin flows from one of the mixing tanks 22 through lines 23 and 46 into tank 24. As the quantity of resin in tank 24 increases, the spring 91 (see FIGURE 3) is compressed and the tank rides lower on its frame. When the tank becomes substantially full, switch SW–1a is closed, thus causing SOL–1a to throw valve V–1 to the vent position. If, at the time this occurs, a vacuum exists in the next higher tank (tank 25 on FIGURE 1) the pressure of the atmosphere within tank 24 will force the resin from the tank out through line 46. It cannot pass downwardly through check valve 47 and so will pass upwardly through line 23 into tank 25. If, on the other hand, no vacuum is being pulled in tank 25, the bulk of the resin will remain in tank 24 until a vacuum is created in the higher tank.

Valve V–2 on tank 25 is controlled in the same way as V–1 by solenoid SOL–2a, which is operated by switch SW–2a, and solenoid SOL–2b, which is operated by switch SW–2b. Thus operation of switch SW–2a will cause valve V–2 to be thrown to the vent position and operation of switch SW–2b will cause the valve V–2 to be thrown to the vacuum position.

It will be remembered that tanks 26 and 27 are positioned at the same level. The control system is arranged to insure that one of the tanks is always available for draining, thus assuring a continuous supply of resin to the battery of machines. The controls are so arranged that the operating cycle on tank 26 dominates the operating cycle of tank 27. So long as there is resin in tank 26, that tank will drain. If tank 27 fills with resin and is ready to drain, it will wait until tank 26 has emptied before starting to drain. Furthermore, if tank 27 is draining, and tank 26 becomes refilled, tank 27 will stop draining and start to refill and allow tank 26 to begin draining.

The simplified control system shown in FIGURE 6 provides for the unloading dominance of tank 26 outlined above, but those skilled in the art will understand that other control system arrangements can be devised to accomplish this purpose also.

Switches SW-3a and SW-3b operate valve V-3 through solenoid SOL-3a and SOL-3b in the same manner as the switches on the lower tanks 24 and 25 operate valves V-1 and V-2. Thus valve V-3 on tank 26 will be thrown to the vent position when the tank becomes full and will be thrown to the vacuum position when the tank becomes empty. As can be seen on FIGURE 6, a stepping switch is provided as part of the control equipment. It is wired to switches SW-3a and EW-3b so that operation of these switches causes the stepping switch to step from one position to the next. Thus the input to the stepping switch is from switches SW-3a and SW-3b on tank 26. The circuit controlled by the stepping switch includes connecting line 107, and lines containing switches SW-4a and SW-4b. The remainder of that controlled circuit includes three solenoids operating valve V-4, namely SOL-4a, SOL-4b and SOL-4c. SOL-4a upon being energized will throw valve V-4 to the vent position. Solenoid SOL-4b throws valve V-4 to the vacuum position and SOL-4c throws valve V-4 to the hold position in which the interior of the tank is cut off from communication both with the vacuum line 65 and with the vent 66.

The internal wiring of the stepping switch is arranged in different configurations so that the control circuit may be differently organized at different step positions.

Consider the case when tank 26, the dominant tank, is draining, and tank 27, the subordinate tank, is filling. In such a situation, switches SW-3a and SW-3b will be open, and the stepping switch will be in its first position. Switches SW-4a and SW-4b are open. Suppose now that tank 27 completes filling but tank 26 has not yet completed draining. The stepping switch circuit is so arranged that when switch SW-4a closes upon the completion of the filling of tank 27, it will energize solenoid SOL-4c to throw V-4 to the hold position. Therefore, tank 27 will not start to drain while tank 26 is still draining.

When tank 26 becomes empty, switch SW-3b closes. This throws valve V-3 to vacuum, and tank 26 starts to fill. Closure of switch SW-3b also steps the stepping switch to its next position. When this occurs, the internal circuit of the stepping switch is so organized that switch SW-4a, which is still closed, energizes SOL-4a to throw valve V-4 to the vent position. Thus tank 27 will start to drain.

As tank 27 drains, switch SW-4a will reopen and as tank 26 starts to fill, switch SW-3b will open. However, the opening of switch SW-3b does not cause a stepping of the stepping switch.

If, now, tank 26 fills while tank 27 is still draining, switch SW-3a will close and valve V-3 will be thrown to the vent position. Thus tank 26 will begin to drain immediately after it has completed filling. This closure of switch SW-3a steps the stepping switch to its next position and arranges the controlled circuit so that line 107 is connected to SOL-4b. In this manner SOL-4b is energized to throw valve V-4 to the vacuum position. Thus the partly empty tank 27 starts to refill at the same time that tank 26 starts to empty. The last mentioned position of the stepping switch is the same as the first mentioned or starting position of the stepping switch. Therefore, the controlled circuit is organized within the switch so that closure of switch SW-4a when tank 27 becomes full will energize solenoid SOL-4c to throw valve V-4 to the hold position. Energization of SOL-4c also interrupts the connection between line 107 and SOL-4b so that both solenoids are not energized at the same time.

The situation now obtaining is that tank 26, the dominant tank, is draining, and tank 27 is full and is being held in the full condition. The foregoing cycle repeats in the same manner although the pace of the cycle may vary somewhat depending upon the quantity of resin being demanded by the machines at any particular time.

It is preferred that the system be operated with at least two mixing tanks and at least two resin storage tanks such as tank 26 and tank 27. By providing such duplicate facilities at the bottom and at the top of the system, continuous supply of resin to a battery of machines is facilitated.

The number of intermediate tanks such as vacuum tanks 24 and 25, can depend upon the requirements of a particular installation. If the vertical lift through the system is smaller than the tallest column of resin supportable by the atmosphere (about 24 feet) and the horizontal distance is not too great, so that there is not too much pressure drop caused by friction in the line, then it may be possible to omit intermediate vacuum tanks. On the other hand, if the height of the system is greater than the tallest column of resin supportable by the atmosphere, it is necessary to use at least one intermediate vacuum tank. If the horizontal distance covered by the system is so great that the pressure drop through the line from one end to the other is greater than one atmosphere, intermediate vacuum tanks should be used even if the total lift is considerably less than the height of a column of resin supportable by the atmosphere.

It is preferred that a return line such as 29 be used. When such a line is employed, it is possible to drain one or the other of the resin storage tanks 26 and 27 continually even though the battery of machines may not be consuming resin at so fast a rate. The material not demanded by the machines which is drained from the upper tanks is returned to the mixing tanks through line 29. A further advantage of the use of a return line is that the resin is kept moving through the system and is not allowed to stagnate in any of the tanks or lines. (It is true that resin is held in various vacuum tanks for relatively short periods, but these holding periods are so short that the bad effects of stagnation are avoided.) If the resin is permitted to stagnate in the tanks and lines, it shows a tendency to set up or harden in place. By keeping the material circulating through the system, this effect is substantially eliminated.

Periodically, the system should be cleaned by pumping a solvent through it. The means of pumping can be the vacuum system used for the resin or can be an auxiliary pump. Various solvents can be used but in accordance with the present invention vinyl toluene is used since it is a cross linking agent which can be incorporated into later resin formulations. An added advantage of this type of solvent is that any traces of the cleaning material which remain in the system after it has been flushed, will not have any adverse effect on the next batch of resin moved through the system after the cleaning. Other cross linking agent can be used if desired.

The vinyl toluene dissolves the resin which may have accumulated in semi-hardened condition in various parts of the system. Thus, in addition to cleaning the system, the solvent acts to recover dissolved resin. The solvent which is used to clean the system is accumulated in a suitable tank after the flushing operation, and it, together with the dissolved resin that it contains, is incorporated into later batches of resin formulations.

I claim:

1. A resin delivery system in combination with a machine for forming articles from heat hardenable liquid resin, said machine having a resin input point and a discharge for excess resin, a local feed tank adjacent the machine, means for effecting flow of resin from the local feed tank to the machine input and for returning excess resin from the machine discharge to the local feed tank, said local feed tank having an inlet and liquid level responsive means for closing said inlet upon a predetermined filling of the local feed tank, said delivery system comprising:

(a) a blending vessel positioned below the machine for final blending of resin therein;

(b) conduit means connected to the bottom of said blending vessel and extending to a location above said machine;

(c) a plurality of vacuum tanks connected to said conduit means at spaced points above the blending vessle;

(d) a source of vacuum;

(e) a valve means for each vacuum tank responsive to the liquid level in its associated tank for connecting the tank to said source of vacuum when the tank is substantially empty and to the atmosphere when the tank is substantially full;

(f) check valves in said conduit means below the connection of each vacuum tank with the conduit means for preventing reverse flow from each tank back to the blending vessel;

(g) a pair of storage tanks located above the level of the machine;

(h) means for supplying resin from said conduit means to each of said storage tanks;

(i) means for delivering resin from each of said storage tanks to a resin feed line;

(j) control valve means associated with each storage tank for alternately applying said vacuum source and atmosphere to each storage tank;

(k) additional valve means between the conduit means and each storage tank and between each storage tank and the resin feed line, said control valve means and an additional valve means being operative to supply said resin feed line from one storage tank while the other storage tank is being filled and to supply said resin feed line from the other storage tank while said one tank is being filled;

(l) means for recycling resin from said resin feed line back to said blending vessel;

(m) means for delivering resin from said resin feed line to the inlet of said local feed tank; and (n) means for delivering resin from said resin feed line to additional machines.

2. A resin feeding system according to claim 1 wherein:

(a) said means for effecting flow or resin from the local feed tank to the machine input is a gravity supply line having a lower discharge portion formed of collapsible tubing and in which the control means comprises a float operated tube pinching device.

3. A feeding system in accordance with claim 2 including:

(a) control means for operating the valve means associated with each vacuum tank comprising for each tank, (i) a tank supporting frame, (ii) a mounting spring reacting between each tank and its supporting frame thereby providing for variation in the vertical position of said tank in accordance with the quantity of resin therein, and (iii) valve operating means including switches and switch operating parts mounted respectively on the tank and tank supporting frame positioned to throw the switches upon movement of the tank.

4. A feeding system according to claim 3 including:

(a) means to connect the tank to the vacuum system when the tank moves upwardly and to connect the tank to the atmosphere when the tank moved downwardly.

References Cited

UNITED STATES PATENTS

| | | | |
|---|---|---|---|
| 424,596 | 4/1890 | Burns | 137—263 X |
| 808,218 | 12/1905 | Reiter | 103—239 |
| 992,711 | 5/1911 | Freeman | 103—241 |
| 1,268,594 | 6/1918 | MacKenzie | 103—236 |
| 2,015,127 | 9/1935 | Rieger | 103—238 X |
| 2,104,663 | 11/1938 | Metzger | 103—243 |
| 2,399,546 | 4/1946 | Edge | 137—563 |
| 2,644,194 | 7/1953 | Bennes | 264—37 |
| 2,717,419 | 9/1955 | Dickey | 264—37 |
| 2,803,043 | 8/1957 | Stephens | 264—37 |
| 2,851,053 | 9/1958 | Wollner | 137—567 X |

ALAN COHAN, *Primary Examiner.*